United States Patent
Dant

(10) Patent No.: US 11,837,057 B1
(45) Date of Patent: *Dec. 5, 2023

(54) INTRUSION DETECTION SYSTEMS AND METHODS

(71) Applicant: CITIBANK, N.A., New York, NY (US)

(72) Inventor: Jeffrey W. Dant, Long Valley, NJ (US)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,554

(22) Filed: Sep. 27, 2022

Related U.S. Application Data

(63) Continuation of application No. 17/382,981, filed on Jul. 22, 2021, now Pat. No. 11,488,453, which is a
(Continued)

(51) Int. Cl.
*G07F 19/00* (2006.01)
*G06Q 20/20* (2012.01)
(Continued)

(52) U.S. Cl.
CPC ......... *G07F 19/207* (2013.01); *G06Q 20/206* (2013.01); *G07F 19/205* (2013.01); *G06F 21/32* (2013.01); *G06K 19/10* (2013.01)

(58) Field of Classification Search
CPC ...... G07F 19/207; G07F 19/20; G07F 19/201; G07F 19/205; G07F 19/209; G07F 19/00; G06Q 20/1085; G06Q 20/206
(Continued)

(56) References Cited

U.S. PATENT DOCUMENTS

| 8,844,807 B1 | 9/2014 | Lawver et al. |
| 11,100,764 B1 | 8/2021 | Dant |

(Continued)

FOREIGN PATENT DOCUMENTS

| CN | 2482716 Y | 3/2002 |
| CN | 101438329 A | 5/2009 |

(Continued)

OTHER PUBLICATIONS

3rd Office Action and Search Report for Chinese Patent Application No. 201910046018.8, English summary provided, dated Oct. 17, 2022, 8 pages.
(Continued)

*Primary Examiner* — Edwyn Labaze
(74) *Attorney, Agent, or Firm* — Johnson, Marcou, Isaacs & Nix, LLC; George Marcou; Scott A. Hendrix

(57) ABSTRACT

An intrusion detection system and method includes an intrusion detection system processor communicatively coupled to multiple environmental change event sensors disposed within an enclosure housing a CPU of an ATM and independent of the CPU of the ATM. In response to receiving an environmental change event notification from one or more of the environmental change event sensors, the intrusion detection system processor commences a predetermined time-out period for entry of valid authentication credentials and deactivates a power supply of the automated teller machine upon expiry of the time-out period without receiving entry of valid authentication credentials.

16 Claims, 2 Drawing Sheets

Related U.S. Application Data continuation of application No. 15/882,520, filed on Jan. 29, 2018, now Pat. No. 11,100,764.

(51) Int. Cl.
  *G06K 19/10* (2006.01)
  *G06F 21/32* (2013.01)

(58) Field of Classification Search
  USPC .................. 705/18, 32–45; 235/379, 375
  See application file for complete search history.

(56) References Cited

U.S. PATENT DOCUMENTS

| | | |
|---|---|---|
| 2005/0171907 A1 | 8/2005 | Lewis |
| 2006/169764 A1 | 8/2006 | Ross et al. |
| 2008/0247609 A1* | 10/2008 | Feris .................. G06V 40/103 340/506 |
| 2012/0293642 A1 | 11/2012 | Berini et al. |
| 2014/0081874 A1 | 3/2014 | Lewis et al. |
| 2019/0266866 A1 | 8/2019 | Wurmfeld |
| 2020/0294351 A1 | 9/2020 | Feng et al. |

FOREIGN PATENT DOCUMENTS

| | | |
|---|---|---|
| CN | 105593691 A | 5/2016 |
| CN | 107064588 A | 8/2017 |
| MX | 401545 | 4/2023 |
| WO | WO-2018218297 A1 * | 12/2018 ......... G07C 9/00912 |

OTHER PUBLICATIONS

Final Office Action for U.S. Appl. No. 15/882,520, dated Jan. 22, 2021, 11 pages.

Chinese Office Action (and English translation) for Chinese Patent Application No. 201910046018.8, dated May 7, 2021, 25 pages.

Second Chinese Office Action for Chinese Patent Application No. 201910046018.8, dated Dec. 28, 2021, 14 pages.

Office Action for U.S. Appl. No. 17/382,981, dated Apr. 21, 2022, 14 pages.

Decision of Rejection for Chinese Patent Application No. 201910046018.8 (includes English translation), dated May 16, 2022, 13 pages.

Office Action for U.S. Appl. No. 15/882,520, dated Aug. 24, 2020, 10 pages.

Office Action for Mexican Patent Application No. MX/a/2019/001205, dated Nov. 1, 2022, 5 pages, includes English-language summary of Office Action.

Decision of Rejection for Chinese Patent Application No. 201910046018.8, dated May 18, 2023, 8 pages.

Fourth Office Action for Chinese Patent Application No. 201910046018.8, dated Feb. 24, 2023, 9 pages, English summary included.

* cited by examiner

INTRUSION DETECTION SYSTEMS AND METHODS

CROSS REFERENCE TO RELATED APPLICATIONS

This application claims priority to and is a continuation of co-pending U.S. patent application Ser. No. 17/382,981 filed Jul. 22, 2021 entitled "Intrusion Detection Systems and Methods", which is a continuation of U.S. patent application Ser. No. 15/882,520 filed Jan. 29, 2018, entitled "Intrusion Detection Systems and Methods", now granted U.S. Pat. No. 11,100,764, issued Aug. 24, 2021, the entire contents of which are hereby expressly incorporated herein by this reference including, without limitation, the specification, claims, and abstract, as well as any figures, tables, or drawings thereof.

FIELD OF THE INVENTION

The present invention relates generally to the field of automated teller machines and more particularly to automated teller machine intrusion detection systems and methods.

BACKGROUND

Automated teller machines (ATMs) may currently be affected by offline logical ATM attacks, which are attacks that occur at ATMs by criminal elements with different variations, such as malware attacks and black box attacks. Such attacks may utilize the CPU of the computer inside the ATM in conjunction with the ATM cash dispenser in order to cause the ATM to dispense money from the safe or vault of the ATM for criminals to steal. When malware is the attack vector, criminals use a computer to run a program that activates the cash dispenser to dispense cash out of the ATM, which the criminals then simply collect. When a black box is the attack vector, a black box running software similar to software running on the central processing unit (CPU) of the ATM, albeit in different formats, is physically connected directly to a cable from the cash dispenser. The black box then mimics the CPU of the ATM in turning on the cash dispenser and likewise dispensing cash out of the ATM vault for the criminals to collect.

Aspects of both the malware and black box attack vectors, as well as all similar logical attacks, include, for example, physical access to the top section of the ATM, commonly referred to as the ATM top hat. The ATM top hat houses the CPU, power supply, and other significant ATM components, as well as access to the power that runs the peripheral components of the ATM, such as the cash dispenser. Thus, both the malware and black box attack vectors require access to the inside of the ATM top hat, either by opening the ATM top hat enclosure in the normal manner, such as using a key for unauthorized entry through an ATM door, or by cutting or drilling an opening in a panel of, or prying off a panel.

Such access is necessary in order for a criminal to insert a hand and/or an implement inside the ATM top hat to enable the criminal to manipulate either a USB by inserting it into the computer of the ATM or by disconnecting a peripheral component that is then plugged into a black box device, such as a laptop employed for the attack. While software solutions are currently offered for monitoring the activity of an ATM, such solutions are typically defeated when an attacker is able to disconnect the ATM network cable prior to performing other actions that meet the predefined rules of such software. There are currently no known hardware solutions available on the market.

There is a current need for a hardware-based intrusion detection systems and methods which prevent ATMs from being exploited by use of offline logical attacks, such as black box and malware attacks, when unauthorized access is detected in the top hat area of an ATM.

SUMMARY OF THE INVENTION

Embodiments of the invention are directed to technological solutions that provide, for example, a system that may include, for example, an automated teller machine top hat intrusion detection system processor communicatively coupled to a plurality of environmental change event sensors disposed within an enclosure housing a central processing unit of an automated teller machine and independent of the central processing unit of the automated teller machine; the intrusion detection system processor being programmed to commence a predetermined time-out period for entry of valid authentication credentials in response to receiving an environmental change event notification from at least one of the plurality of environmental change event sensors; and the intrusion detection system processor being further programmed to deactivate a power supply of the automated teller machine upon expiry of the time-out period without receiving entry of valid authentication credentials.

In embodiments of the invention, the at least one of the plurality of environmental change event sensors may be, for example, a motion sensor, a vibration sensor, a light sensor, or a door opening alert sensor disposed within the enclosure housing the central processing unit of the automated teller machine and independent of the central processing unit of the automated teller machine. In other embodiments, the at least one of the plurality of environmental change event sensors may be, for example, the motion sensor disposed within the enclosure housing the central processing unit of the automated teller machine and independent of the central processing unit of the automated teller machine.

In additional embodiments of the invention, the at least one of the plurality of environmental change event sensors may be, for example, the vibration sensor disposed within the enclosure housing the central processing unit of the automated teller machine and independent of the central processing unit of the automated teller machine. In further embodiments, the at least one of the plurality of environmental change event sensors may be, for example, the light sensor disposed within the enclosure housing the central processing unit of the automated teller machine and independent of the central processing unit of the automated teller machine. In still further embodiments, the least one of the plurality of environmental change event sensors may be, for example, the door opening alert sensor disposed within the enclosure housing the central processing unit of the automated teller machine and independent of the central processing unit of the automated teller machine.

In still other embodiments of the invention, the intrusion detection system processor may be further programmed, for example, to prompt entry of the valid authentication credentials upon commencement of the predetermined time-out period via activation of a signal. In further embodiments, the intrusion detection system processor may be further programmed, for example, to prompt entry of the valid authentication credentials via activation of at least one of a visual signal and an auditory signal.

In additional embodiments of the invention, the intrusion detection system processor may be further programmed to deactivate the power supply of the automated teller machine upon expiry of the time-out period without receiving entry of valid authentication credentials via a smart card reader disposed within the enclosure housing the central processing unit of the automated teller machine and communicatively coupled to the intrusion detection system processor. In other embodiments, the intrusion detection system processor may be further programmed, for example, to activate at least one of an audio recorder and image recorder disposed within the enclosure housing the central processing unit of the automated teller machine and communicably coupled to the intrusion detection system processor upon expiry of the time-out period without receiving entry of valid authentication credentials.

A method for embodiments of the invention may involve, for example, providing an automated teller machine top hat intrusion detection system processor communicatively coupled to a plurality of environmental change event sensors disposed within an enclosure housing a central processing unit of an automated teller machine and independent of the central processing unit of the automated teller machine; commencing, by the intrusion detection system processor, a predetermined time-out period for entry of valid authentication credentials in response to receiving an environmental change event notification from at least one of the plurality of environmental change event sensor; and deactivating, by the intrusion detection system processor, a power supply of the automated teller machine upon expiry of the time-out period without receiving entry of valid authentication credentials.

In further embodiments, providing the automated teller machine top hat intrusion detection system processor communicatively coupled to the plurality of environmental change event sensors may involve, for example, providing the automated teller machine top hat intrusion detection system processor communicatively coupled to a motion sensor, a vibration sensor, a light sensor, and/or a door opening alert sensor disposed within the enclosure housing the central processing unit of the automated teller machine and independent of the central processing unit of the automated teller machine. In still further embodiments, commencing the predetermined time-out period for entry of valid authentication credentials in response to receiving the environmental change event notification from at least one of the plurality of environmental change event sensor may involve, for example, commencing the predetermined time-out period for entry of valid authentication credentials in response to receiving an environmental change event notification from at least one of a motion sensor, a vibration sensor, a light sensor, and/or an independent door opening sensor.

In additional embodiments of the invention, wherein deactivating the power supply of the automated teller machine upon expiry of the time-out period may involve, for example, deactivating the power supply of the automated teller machine upon expiry of the time-out period without receiving entry of valid authentication credentials via a smart card reader disposed within the enclosure housing the central processing unit of the automated teller machine and communicatively coupled to the intrusion detection system processor. Still other embodiments may involve, for example, activating at least one of an audio recorder and image recorder disposed within the enclosure housing the central processing unit of the automated teller machine and communicably coupled to the intrusion detection system processor upon expiry of the time-out period without receiving entry of valid authentication credentials.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention may provide, for example, a hardware-based, locally deployed intrusion detection system mounted inside the ATM to combat all such different types of ATM top hat intrusion attacks. For example, embodiments of the invention may provide an intrusion detection system for ATMs which prevents an ATM from being exploited by use of an offline logical attack, such as a black box or malware attack, by powering down the ATM when unauthorized access is detected in the ATM top hat area.

Such a system for embodiments of the invention may detect intrusion into the top hat of an ATM, for example, through a series of sensors. Thus, if one or more sensors are triggered, an authorized person, such as an ATM technician, must authenticate himself or herself within a predetermined period of time. Upon failure to authenticate within the timeout period, the ATM may be automatically powered down, thereby preventing any online or offline logical attacks on the ATM.

Figure 1:
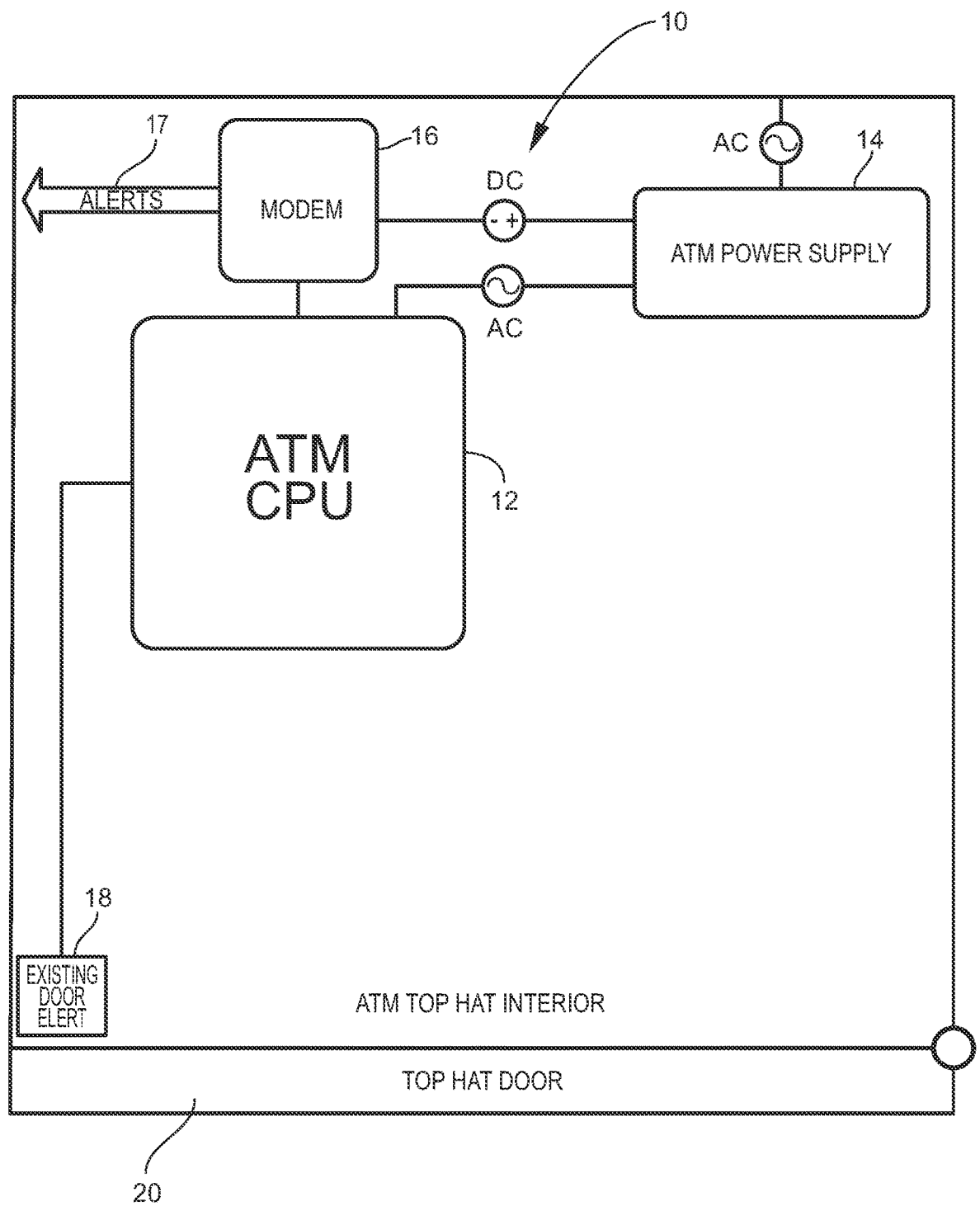
FIG. 1 is a schematic diagram view of an example of components disposed in an interior of a top hat enclosure of a typical automated teller machine.

FIG. 1 is a schematic diagram view of an overview example of components disposed in an interior of a top hat enclosure of a typical automated teller machine. Referring to FIG. 1, existing components of a typical ATM top hat enclosure 10 may include, for example, an ATM CPU 12, which may be coupled to an ATM power supply 14, as well as to a modem 16, a standard ATM alert system 17, and to an existing ATM door alert sensor 18. The ATM top hat area 10 may normally be accessible via a top hat door 20.

Figure 2:
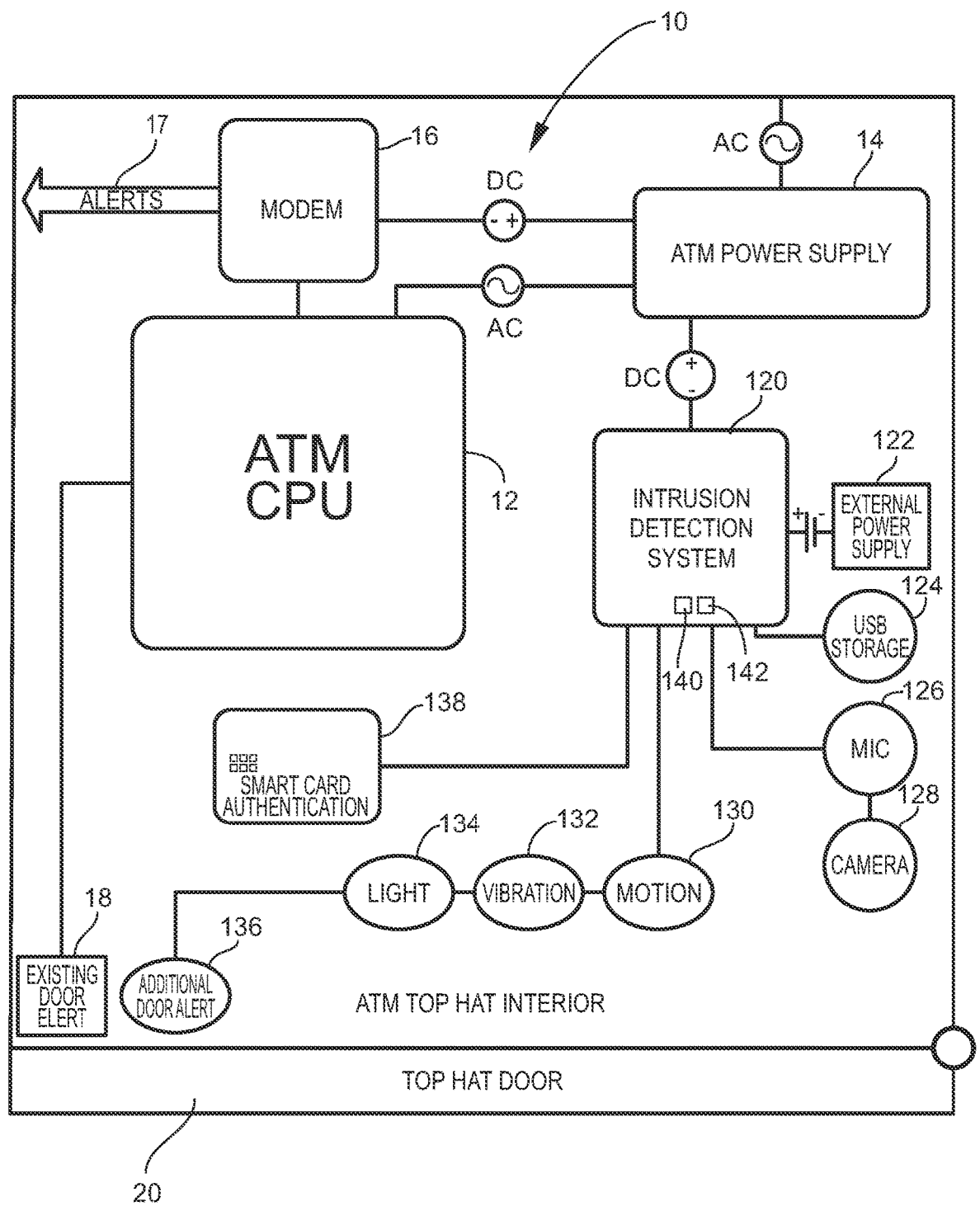
FIG. 2 is a schematic diagram view that illustrates an example of components for an intrusion detection system for embodiments of the invention deployed in the interior of the top hat enclosure of the typical automated teller machine depicted in FIG. 1.

FIG. 2 is a schematic diagram view that illustrates an example of components for an intrusion detection system for embodiments of the invention deployed in the interior of the top hat enclosure 10 of the typical automated teller machine depicted in FIG. 1. Referring to FIG. 2, components of a system for embodiments of the invention may include an intrusion detection system processor 120, which may be coupled, for example, to an external power supply 122. In addition, the intrusion detection system processor 120 may be communicatively coupled, for example, to USB storage 124, a microphone 126, and a camera 128. The intrusion detection system processor 120 may also be coupled, for example, to an authentication mechanism 138, such as a smart card reader.

Referring further to FIG. 2, in addition, the intrusion detection system processor 120 for embodiments of the invention may be coupled, for example, to multiple sensors, such as a motion sensor 130, a vibration sensor 132, a light sensor 134, and an additional door opening alert sensor 136. In embodiments of the invention, such multiple sensors, motion sensor 130, vibration sensor 132, light sensor 134, and additional door opening alert sensor 136, may work in conjunction with one another to eliminate generation of false positive alerts.

For example, assume that all the sensors for detecting motion 130, vibration 132, and light 134 are triggered at or about the same time without a triggering of the additional door-opening sensor 136. In that event, it is virtually certain that the top hat interior 10 has been accessed other than via normal top hat door 20 access. It is likewise virtually certain that an intrusion alert generated by the intrusion detection system processor 120 for embodiments of the invention is not a false positive. Once the sensors for detecting motion 130, vibration 132, and light 134 are triggered, the camera 128 and microphone 126 may begin recording video or still pictures and audio, respectively, inside the ATM top hat 10 to establish a record of such access to the top hat interior 10 of the ATM.

It is self-apparent that the existing door alert 18 is only capable of sensing an intrusion into the ATM top hat enclosure 10 through normal opening of the top hat door 20 and is incapable of sensing other intrusions, such as drilling, cutting or prying a panel of the ATM top hat 10. The motion 130, vibration 132, light 134, and additional door opening alert 136 sensors for embodiments of the invention may address such intrusions. For example, the additional door opening alert sensor 136 of the system for embodiments of the invention may function similarly to the existing door alert 18 in sensing opening of the ATM top hat door 20 with a key, but the additional door opening alert sensor 136 may also activate the authentication mechanism 138.

In addition, embodiments of the invention may provide a combination of alerts that address intrusion into the ATM top hat 10 other than through opening the top hat door 20. For example, the vibration sensor 132 may detect vibrations caused by a criminal shaking the ATM in attempting to cut, drill, or remove a panel of the top hat 10. For another example, the motion sensor 130 may detect movement of a hand and/or implement inside the ATM top hat 10 even when cutting, drilling, or removing a panel or opening of the door 20 of the ATM top hat is not detected by other sensors. For still another example, the light sensor 134 may detect the presence of light inside the ATM top hat 10, which is normally completely dark except when opened in some way to admit outside light during legitimate usage.

In embodiments of the invention, the motion sensor 130, the vibration sensor 132, and the light sensor 134 may be employed in parallel with one another or may be employed based on predefined rules of a rule system. Assume, for example, that a person employs a key to open the door 20 of the ATM top hat 10. When the door 20 is thus opened, the additional door alert 136 and the light sensor 134 may both be activated. In response to activation of either or both such sensors, a warning, such as a sound 140 or light 142 warning, may in turn be activated.

An aspect of the instruction detection system for embodiments of the invention may require that any person accessing the top hat interior 10 of the ATM, whether such access is by use of an ATM key to open the door 20 or, for example, by cutting, drilling or prying a panel of the ATM top hat, must authenticate himself or herself to validate that the opening is for legitimate purposes. Such authentication may involve, for example, employment of the authentication mechanism 138, such as a smart card reader or entry of a one-time password. It is to be understood that use of a smart card or one-time-password for authentication is exemplary only and that any other suitable type of authentication may be employed for embodiments of the invention.

If such person who opened the top hat 10 of the ATM does not or cannot authenticate properly to the system via the authentication mechanism 138, such as by smart card, one-time-password, or other type of authentication employed for embodiments of the invention, various mechanisms may be activated. For example, the camera 128 may be activated to record video or take still pictures of activities within view of the camera as evidence of criminal activity. In addition, as a defense mechanism, the ATM power supply 14 may be disconnected from the ATM CPU 12. It is to be understood that any type of logical attack is rendered impossible when power to the ATM CPU 12 is turned off. Further, when the ATM powers off, a notification through a standard ATM alert system 17 may typically be automatically activated to notify ATM management that the ATM is now off, resulting in initializing of normal remediation processes by management.

As noted, a typical ATM has a top hat existing door alert 18 that may notify management operations when the top hat door 20 is opened. However, the existing door alert 18 may not always be accurate, resulting in false positives. In embodiments of the invention an authorized person, such as an ATM technician, may be aware of the significance of activation of the sound 140 or light 142 warning and may possess the necessary authentication tools and methodology to avoid false positive alerts.

Thus, such an authorized person may simply use the authentication mechanism 138 to authenticate to the intrusion detection system 120 for embodiments of the invention, for example, using a smart card in a smart card reader or entering a one-time password to deactivate the system in order to perform a task inside the ATM top hat 10. Once such task is completed, the ATM top hat door 20 may be re-closed, and the intrusion detection system for embodiments of the invention may be reset to become active again.

If an unauthorized person opens the ATM top hat door 20 with a key, the intrusion detection system for embodiments of the invention may likewise prompt for an authentication. In addition, the camera 128 may be activated to start collecting visual evidence in the form of photographs or video. If the pre-determined period of time elapses after a prompt, such as activation of the sound 140 or light 142 warning without authentication, the intrusion detection system for embodiments of the invention may disconnect the ATM power supply 14 to prevent any type of logical attack.

On the other hand, in the event one or more of the motion 130, vibration 132, and light 134 sensors are activated when the additional door alert 136 is not activated, it is self-apparent that any person accessing the inside of the ATM top hat 10 may be unauthorized. In such case, the intrusion detection system for embodiments of the invention may disconnect the ATM power supply 14 immediately without an authentication warning to prevent any type of logical attack.

As noted, in embodiments of the invention, the sensors may work independently of one another or in parallel with one another. Thus, implementation of the intrusion system for embodiments of the invention may be customizable to reflect various security measures. For example, in the event of activation of the motion 130, vibration, 132, and/or light 134 sensors without activation of the additional door opening alert 136, the authentication mechanism 138 may not be made available because the existence of motion, vibration, and/or light in the ATM top hat enclosure 10 without opening of the top hat door 20 would be a strong indicator of an unauthorized intrusion.

For a further example, each time the additional door opening alert 136 detects opening of the top hat door 20, the camera 128 may be activated to capture evidence of whatever may occur within the ATM top hat enclosure 10. Thus, the camera 128 may be activated whether or not authentication is entered within the predetermined time period following activation of the authentication warning. Such evidence may be useful, for example, when an authorized person may have authenticated access but nonetheless cash was later discovered to be missing from the ATM through reconciliation. Similarly, such evidence may be useful when some other type of insider threat or collusion may have occurred, such as when a person who may have authenticated access provided an unauthorized person access to the ATM top hat enclosure 10 after authenticating.

When an ATM shuts down, a typical maintenance program may send a regular alert via the existing alert system 17, for example, to notify an operations team that the particular ATM is turned off. That notification may indicate to the operations team that the notification should to be responded to in order to evaluate and remediate the ATM. Embodiments of the invention may add other capabilities such as wireless components.

It is to be understood that the intrusion detection system for embodiments of the invention may employ commercially available components. For example, the intrusion detection system processor 120 may be incorporated, for example, in a single-board computer, such as developed by RASBERRY PI, or other suitable devices. Further, suitable peripheral components are commercially available, and various types of sensor devices are easy to obtain, simple to function, and relatively inexpensive. The intrusion detection system for embodiments of the invention works locally and requires no network connectivity or interaction with the ATM CPU 102.

For example, a motion sensor suitable for embodiments of the invention may comprise, for example, a simple passive infrared sensor (PIR) typically used to sense movement of people, tools or other objects that are commonly used in burglar alarms and automatically-activated lighting systems. Such motion sensors are widely commercially available. A suitable light sensor for embodiments of the invention may comprise, for example, a photoelectric sensor that detects light and can be adjusted for sensitivity. Such light sensors are likewise widely commercially available.

A vibration sensor suitable for embodiments of the invention may comprise, for example, a simple vibration sensor, similar to vibration sensors commonly used in arcade games and vending machines and also commercially available from numerous sources. Still further, a door alert sensor that may be employed for embodiments of the invention may comprise, for example, a simple contact switch, similar to home security system window and door sensors available for purchase from various vendors. An evidence collection camera for embodiments of the invention may comprise, for example, a type of wide angle pinhole camera that can be hidden inside an ATM to prevent damage or theft, to record evidence onto a secure digital (SD) card or USB storage that can be secured in safe storage for evidence retention purposes. Such cameras are commercially available from many sources.

What is claimed is:

1. A system, comprising:
an automated teller machine top hat intrusion detection system processor communicatively coupled to at least one event sensor disposed within an enclosure housing a central processing unit of an automated teller machine that is programmed to;
commence a predetermined time-out period for entry of the valid authentication credentials from the user authorized to enter the enclosure housing in response to receiving an event notification from the at least one event sensor;
leave intact a power supply of the automated teller machine during the predetermined time-out period; and
deactivate a power supply of the automated teller machine based on a determination that the time-out period has expired before without receiving entry of valid authentication credentials.

2. The system of claim 1, wherein the at least one event sensor is an environmental change sensor that comprises a motion sensor, a vibration sensor, a light sensor, or a door opening alert sensor disposed within the enclosure housing the central processing unit of the automated teller machine and independent of the central processing unit of the automated teller machine.

3. The system of claim 2, wherein the at least one environmental change event sensor comprises the motion sensor disposed within the enclosure housing the central processing unit of the automated teller machine and independent of the central processing unit of the automated teller machine.

4. The system of claim 2, wherein the at least one environmental change event sensor comprises the vibration sensor disposed within the enclosure housing the central processing unit of the automated teller machine and independent of the central processing unit of the automated teller machine.

5. The system of claim 2, wherein the at least one environmental change event sensor comprises the light sensor disposed within the enclosure housing the central processing unit of the automated teller machine and independent of the central processing unit of the automated teller machine.

6. The system of claim 2, wherein the at least one environmental change event sensor comprises the door opening alert sensor disposed within the enclosure housing the central processing unit of the automated teller machine and independent of the central processing unit of the automated teller machine.

7. The system of claim 1, the intrusion detection system processor being further programmed to prompt entry of the valid authentication credentials upon commencement of the predetermined time-out period via activation of a signal.

8. The system of claim 7, the intrusion detection system processor being further programmed to prompt entry of the valid authentication credentials via activation of at least one of a visual signal and an auditory signal.

9. The system of claim 1, the intrusion detection system processor being further programmed to deactivate the power supply of the automated teller machine upon expiry of the time-out period without receiving entry of valid authentication credentials via a smart card reader disposed within the enclosure housing the central processing unit of the automated teller machine and communicatively coupled to the intrusion detection system processor.

10. The system of claim 1, the intrusion detection system processor being further programmed to activate at least one of an audio recorder and image recorder disposed within the enclosure housing the central processing unit of the automated teller machine and communicably coupled to the intrusion detection system processor upon expiry of the time-out period without receiving entry of valid authentication credentials.

11. The system of claim 1, the intrusion detection system processor being further programmed to activate at least one of an audio recorder and image recorder disposed within the enclosure housing the central processing unit of the automated teller machine and communicably coupled to the intrusion detection system processor upon expiry of the time-out period without receiving entry of valid authentication credentials.

12. A method, comprising:
providing an automated teller machine top hat intrusion detection system processor communicatively coupled to at least one sensor disposed within an enclosure housing of an automated teller machine;
commencing, by the intrusion detection system processor, a predetermined time-out period for entry of valid authentication credentials in response to receiving a notification from at least one of the at least one sensor;
leaving, by the intrusion detection system processor, intact a power supply of the automated teller machine during the predetermined time-out period; and
leaving, by the intrusion detection system processor, intact a power supply of the automated teller machine upon receiving entry of valid authentication credentials.

13. The method of claim 12, wherein providing the automated teller machine top hat intrusion detection system processor communicatively coupled to the at least one sensor comprises providing the automated teller machine top hat intrusion detection system processor communicatively coupled to environmental change event sensors comprising a motion sensor, a vibration sensor, a light sensor, and a door opening alert sensor disposed within the enclosure housing the central processing unit of the automated teller machine and independent of the central processing unit of the automated teller machine.

14. The method of claim 12, wherein commencing the predetermined time-out period for entry of valid authentication credentials in response to receiving the environmental change event notification from at least one of the at least one sensor further comprises commencing the predetermined time-out period for entry of valid authentication credentials in response to receiving an environmental change event notification from at least one of a motion sensor, a vibration sensor, a light sensor, and an independent door opening sensor.

15. The method of claim 12, further comprising deactivating the power supply of the automated teller machine upon expiry of the time-out period without receiving entry of valid authentication credentials via a smart card reader disposed within the enclosure housing the central processing unit of the automated teller machine and communicatively coupled to the intrusion detection system processor.

16. The method of claim 12, further comprising activating at least one of an audio recorder and image recorder disposed within the enclosure housing the central processing unit of the automated teller machine and communicably coupled to the intrusion detection system processor upon expiry of the time-out period without receiving entry of valid authentication credentials.

* * * * *